(12) United States Patent
Miwa

(10) Patent No.: US 11,089,181 B2
(45) Date of Patent: Aug. 10, 2021

(54) IMAGE FORMING APPARATUS, SYSTEM AND PROGRAM PRODUCT ACQUIRING COLOR INFORMATION OF IMAGE PRINTED ON FIRST SIDE BEFORE PRINTING ON SECOND SIDE OF PRINT MEDIUM

(71) Applicant: Ryotaro Miwa, Kanagawa (JP)

(72) Inventor: Ryotaro Miwa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/911,741

(22) Filed: Jun. 25, 2020

(65) Prior Publication Data

US 2021/0006664 A1 Jan. 7, 2021

(30) Foreign Application Priority Data

Jul. 3, 2019 (JP) .............................. JP2019-124403
May 14, 2020 (JP) .............................. JP2020-085464

(51) Int. Cl.
| | | |
|---|---|---|
| *H04N 1/00* | (2006.01) | |
| *H04N 1/56* | (2006.01) | |
| *H04N 1/60* | (2006.01) | |
| *G06F 3/12* | (2006.01) | |
| *H04N 1/409* | (2006.01) | |

(52) U.S. Cl.
CPC ............ *H04N 1/60* (2013.01); *G06F 3/1296* (2013.01); *H04N 1/00005* (2013.01); *H04N 1/00037* (2013.01); *H04N 1/4095* (2013.01); *H04N 1/56* (2013.01); *H04N 1/6097* (2013.01)

(58) Field of Classification Search
CPC ........... H04N 1/00005; H04N 1/00023; H04N 1/00037; H04N 1/2369; H04N 1/4095; H04N 1/60; H04N 1/6008; H04N 1/6027; H04N 1/603; H04N 1/6097
See application file for complete search history.

(56) References Cited

U.S. PATENT DOCUMENTS

| 8,405,869 B2* | 3/2013 | Harigai | ................ H04N 1/6033 358/1.9 |
|---|---|---|---|
| 10,389,919 B2 | 8/2019 | Miwa | |
| 2016/0052317 A1* | 2/2016 | Kyoso | ........................ B41J 3/60 347/19 |

FOREIGN PATENT DOCUMENTS

| JP | 2003-087568 | 3/2003 |
|---|---|---|
| JP | 2004-021021 | 1/2004 |
| JP | 2018-157529 | 10/2018 |

* cited by examiner

*Primary Examiner* — Scott A Rogers
(74) *Attorney, Agent, or Firm* — IPUSA, PLLC

(57) ABSTRACT

An image forming apparatus includes a printer configured to print on a print medium, and a reading unit configured to acquire color information of an image printed on the print medium. In printing on both sides being a first side and a second side of the print medium opposite the first side, upon a determination that a predetermined condition is met, the reading unit is configured to acquire the color information of the image printed on the first side of the print medium, after printing on the first side of the print medium is provided and before printing on the second side of the print medium is provided.

8 Claims, 13 Drawing Sheets

IMAGE FORMING APPARATUS, SYSTEM AND PROGRAM PRODUCT ACQUIRING COLOR INFORMATION OF IMAGE PRINTED ON FIRST SIDE BEFORE PRINTING ON SECOND SIDE OF PRINT MEDIUM

CROSS-REFERENCE TO RELATED APPLICATIONS

The present application claims priority under 35 U.S.C. § 119 to Japanese Patent Application Nos. 2019-124403, filed Jul. 3, 2019, and 2020-85464, filed May 14, 2020, the contents of which are incorporated herein by reference in their entirety.

BACKGROUND OF THE INVENTION

1. Field of the Invention

The present disclosure relates to an image forming apparatus, an image forming system, and a recording medium.

2. Description of the Related Art

For image forming apparatuses, when print color alters over time, techniques are used to correct the print color based on color information of a printed image acquired by an inline sensor or the like.

However, in printing on two sides of a print medium, when the print color is corrected, show-through, which means that an image on one side of the print medium printed on two sides is transmitted through the other side of the print medium, may occur and thus there may be cases where the color information of the printed image cannot be acquired appropriately.

As a technique of reducing an effect of the show-through, a technique is disclosed to correct print color without using color information corresponding to a highlight portion of a printed image. The color information corresponding to a base portion of the print medium where an image is not formed, is not corrected (e.g., Japanese Unexamined Patent Application Publication No. 2003-87568 which is hereinafter referred to as Patent document 1).

SUMMARY

According to the techniques described below, an image forming apparatus includes a printer configured to print on a print medium, and a reading unit configured to acquire color information of an image printed on the print medium. In printing on both sides being a first side and a second side of the print medium opposite the first side, upon a determination that a predetermined condition is met, the reading unit is configured to acquire the color information of the image printed on the first side of the print medium, after printing on the first side of the print medium is provided and before printing on the second side of the print medium is provided.

DETAILED DESCRIPTION OF THE EMBODIMENTS

Figure 1:
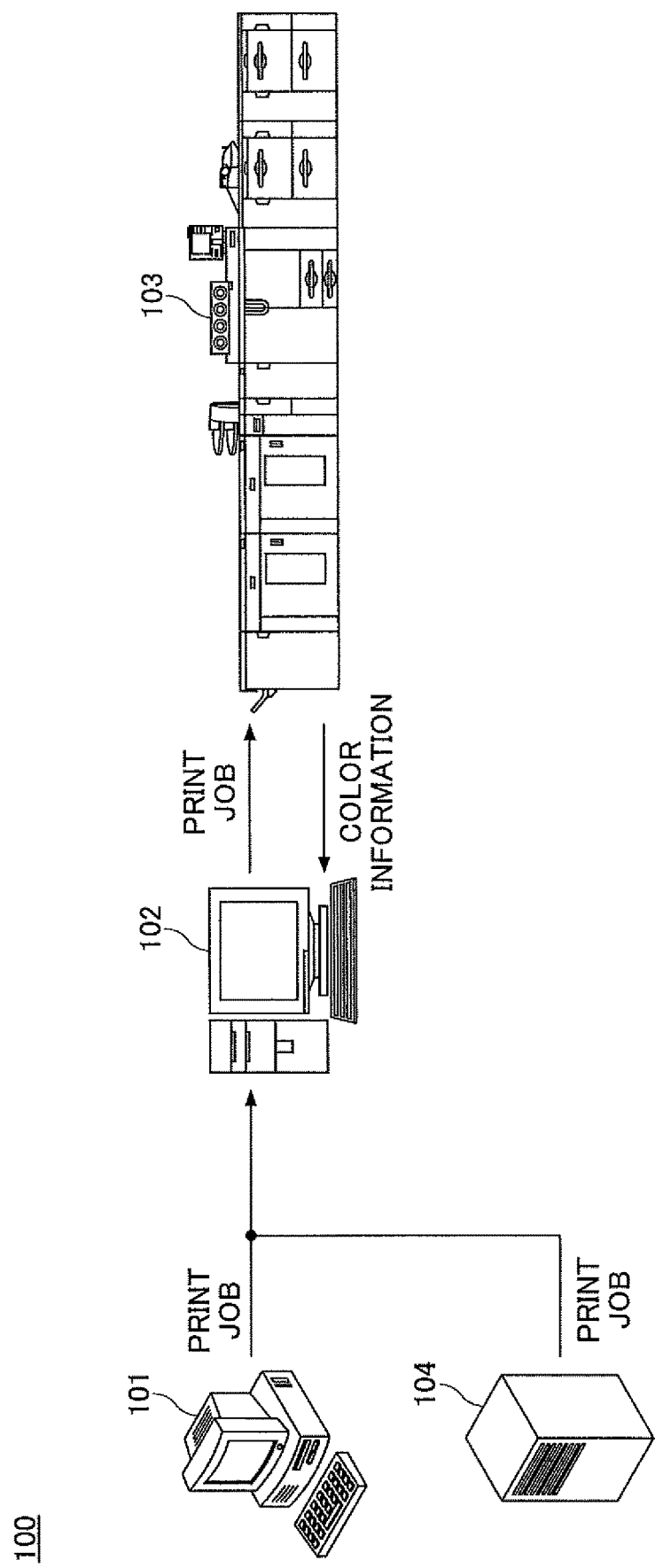
FIG. 1 is a diagram illustrating an example of the configuration of an image forming system according to one or more embodiments.

One or more embodiments will be hereinafter described with reference to the drawings. In each figure, the same reference numerals are used to denote the same components; accordingly, the duplicate explanation for the components may be omitted.

According to one or more embodiments, when show-through is determined to occur in printing on two sides of a print medium, an image forming apparatus acquires color information of an image printed on a first side of the print medium, after printing on the first side of the print medium and before printing on a second side of the print medium. The image forming apparatus further corrects color (print color) of the printed image, based on the acquired color information.

In the following description, one or more embodiments will be described using an example of an image forming system 100 including the image forming apparatus according to the embodiments.

Note that the terms "printing", "image forming", and "printout" used in one or more embodiments are interchangeably used in the embodiments.

<Overall Configuration of Image Forming System>

Hereafter, an example of the configuration of the image forming system 100 will be described. FIG. 1 is a diagram illustrating an example of the configuration of the image forming system 100. As illustrated in FIG. 1, the image forming system 100 includes a client personal computer (PC) 101, a digital front end (DFE) 102, an image forming apparatus 103, and a management server 104, which are communicably interconnected via the Internet or the like.

The client PC 101 generates a print job (a unit of a job to be executed by a computer) to be executed by the image forming apparatus 103 and outputs the print job to the DFE 102 or the management server 104. The DFE 102 transmits rendering data to the image forming apparatus 103, the rendering data being generated by a raster image processor (RIP) engine, based on the print job received from the client PC 101 or the management server 104. Note that the DFE 102 is an example of an image processing apparatus.

The image forming apparatus 103 prints on the print medium, based on the rendering data received from the DFE 102. The image forming apparatus 103 transmits color information acquired by one or more inline sensors provided in the image forming apparatus 103, to the DFE 102. In order to correct print color, the DFE 102 corrects a gamma curve for gradation conversion, based on the color information received from the image forming apparatus 103, where the gradation curve is stored in the DFE 102.

The management server 104 manages the print job received from the client PC 101 and transmits the print job to the DFE 102 in accordance with a request from the DFE 102.

<Configuration of Image Forming Apparatus According to the Embodiments>

Figure 2:
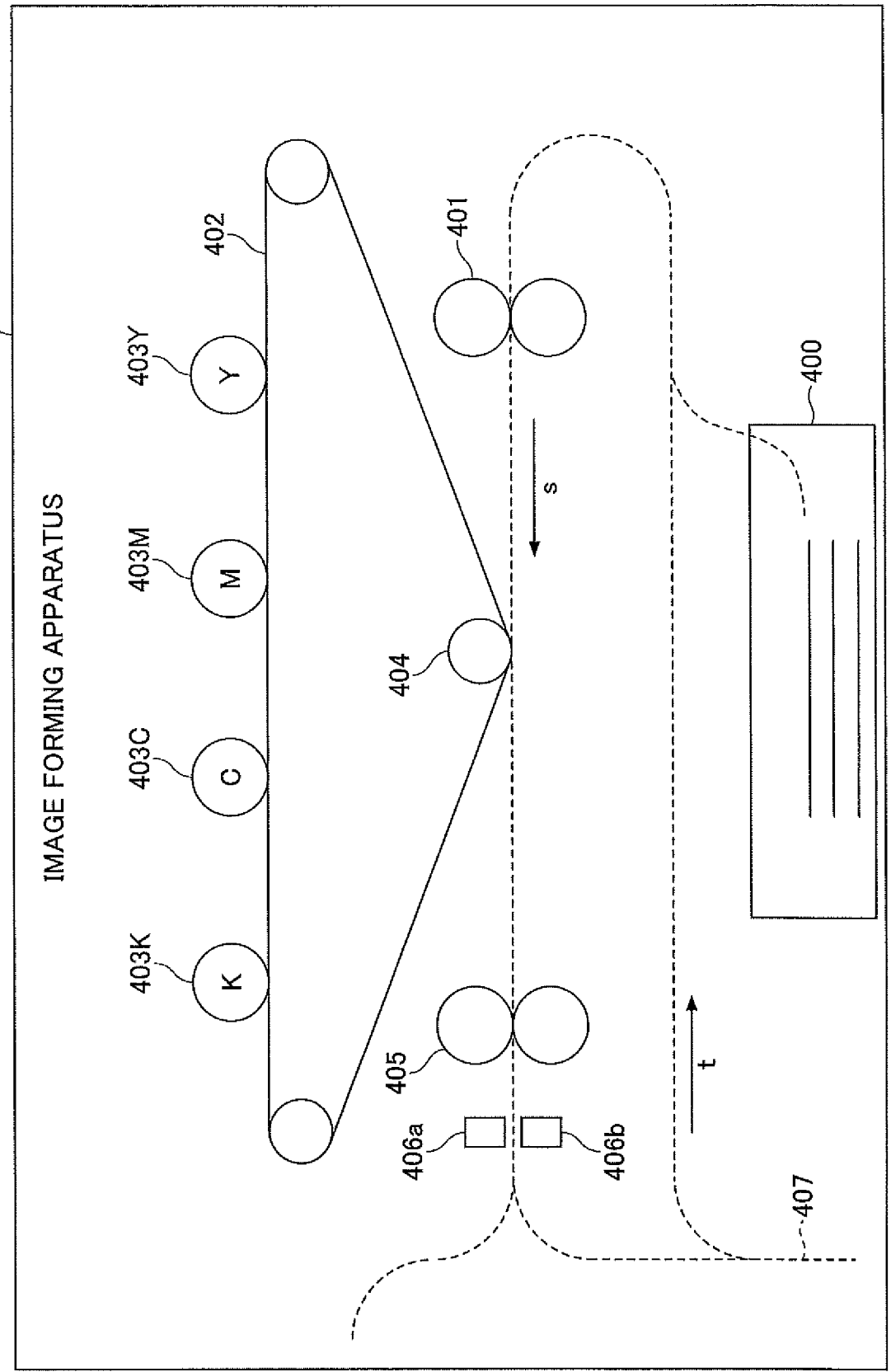
FIG. 2 is a diagram illustrating an example of the configuration of an image forming apparatus according to one or more embodiments.

Hereafter, the configuration of the image forming apparatus 103 according to the embodiments will be described. FIG. 2 is a diagram illustrating an example of the configuration of the image forming apparatus 103. As illustrated in FIG. 2, the image forming apparatus 103 includes tandem electrophotographic image formation units 403K, 403C, 403M, and 403Y; an intermediate transfer belt 402; and a second transfer roller 404. The image forming apparatus 103 includes a paper feeding unit 400; a pair of conveyance rollers 401; fixing rollers 405; and a reverse path 407.

Each of the image formation units 403K, 403C, 403M, and 403Y performs an image formation process (a charging process, an exposure process, a development process, a transfer process, and a cleaning process) to form a toner image, and then first transfers the toner image to the intermediate transfer belt 402. According to the embodiments, the image formation unit 403K forms a black (K) toner image, and the image formation unit 403C forms a cyan (C) toner image. Further, the image formation unit 403M forms a magenta (M) toner image, and the image formation unit 403Y forms a yellow (Y) toner image. Note, however, that an order in which the image formation units 403K, 403C, 403M, and 403Y are arranged is not limited to the above example and may be changed as appropriate. The image forming apparatus 103 may include an image formation unit that forms a color toner image of other than Y, M, C, and K. The color other than Y, M, C, and K is white or the like.

The intermediate transfer belt 402 conveys a full color toner image to a second transfer location at which the full color toner image is transferred by the second transfer roller 404, the full color toner image being formed with superimposed color toners that are respectively first transferred by the image formation units 403K, 403C, 403M, and 403Y. According to the embodiments, the K toner image is first transferred to the intermediate transfer belt 402, and subsequently, the C toner image, the M toner image, and the Y toner image are sequentially, transferred to the intermediate transfer belt 402 to thereby be superimposed. Note that in the following description, when the colors are not particularly distinguished, the image formation units 403K, 403C, 403M, and 403Y are collectively referred to as image formation units 403.

The paper feeding unit 400 stores multiple print mediums that are stacked, and feeds one or more print mediums. The print medium includes recording paper (transfer paper) or the like, and is not limited to the above example. The print medium may include coated paper, cardboard, an overhead projector (OHP) sheet, a plastic film, prepreg, copper foil, or the like, when the print medium is a medium on which an image can be formed (recorded).

The pair of conveyance rollers 401 causes the print medium fed by the paper feeding unit 400 to be conveyed along a conveyance path in a direction represented by the arrow s. The second transfer roller 404 concurrently transfers (second transfer) the full color toner image conveyed by the intermediate transfer belt 402 onto the print medium conveyed through the pair of conveyance rollers 401, at the second transfer location. The fixing rollers 405 fix the full color toner image to the print medium, when heat and pressure are applied to the print medium onto which the full color toner image is transferred.

The inline sensors 406a and 406b are provided downstream of the fixing rollers 405 in the direction represented by the arrow s. The inline sensor 406a reads the image printed on the first side of the print medium that faces the inline sensor 406a, and acquires color information of the printed image. The inline sensor 406b reads the image printed on the second side of the print medium that faces the inline sensor 406b, and acquires color information of the printed image. Note that the second side of the print medium is the side (back sheet) opposite the first side (front sheet) of the print medium. Note that in FIG. 2, the two inline sensors 406a and 406b are illustrated, but the inline sensor 406a may be provided only.

In the description, the inline sensor 406a and the inline sensor 406b are CCD (Charge Coupled Device) line sensors in each of which pixels are arranged in a one-dimensional array and that output electrical signals in accordance with intensities of received light. The pixels are arranged in a direction intersecting the direction that is represented by the arrow s and in which the print medium is conveyed. Each of the inline sensor 406a and the inline sensor 406b includes a pixel array for receiving red light (R); a pixel array for receiving green light (G); and a pixel array for receiving blue light (B).

Each of the inline sensor 406a and the inline sensor 406b outputs the electrical signals through the respective colored pixel arrays, each electrical signal being in accordance with intensity of light reflected with respect to the image printed on the print medium. With use of the output signals of the inline sensor 406a and the inline sensor 406b, the image printed on a given side of the print medium is read. Each colored light intensity (density) with respect to the read image is used as color information in order to correct the print color.

Note that the inline sensor 406a and the inline sensor 406b may each include a light source that irradiates the print medium with light. When the light source irradiates the print medium with light, brightness allowing each of the inline sensor 406a and the inline sensor 406b to read the image can be ensured. Instead of the CCD, the inline sensor 406a and the inline sensor 406b may each include a complementary metal-oxide-semiconductor (CMOS), a photo diode (PD) array, or the like.

In the case of single-sided printing (printing on the first side only), the image forming apparatus 103 discharges the print medium to which the full color toner image is fixed. In contrast, in the case of two-sided printing (printing on both sides being the first side and the second side), the image forming apparatus 103 transmits the print medium to which the full colored toner image is fixed, to the reverse path 407.

The transferred print medium is moved back along the reverse path 407, while the front of the sheet of the print medium is reversed to become the back of the sheet of the print medium. The print medium is then conveyed in the direction represented by the arrow s. The print medium conveyed along the reverse path 407 is again conveyed through the pair of conveyance rollers 401. The full color toner image is transferred onto the second side of the print medium opposite the first side of the print medium, by the second transfer roller 404 and is fixed by the fixing rollers 405. Subsequently, the print medium is discharged from the image forming apparatus 103.

<Hardware Configuration of the Image Forming Apparatus According to the Embodiments>

Figure 3:
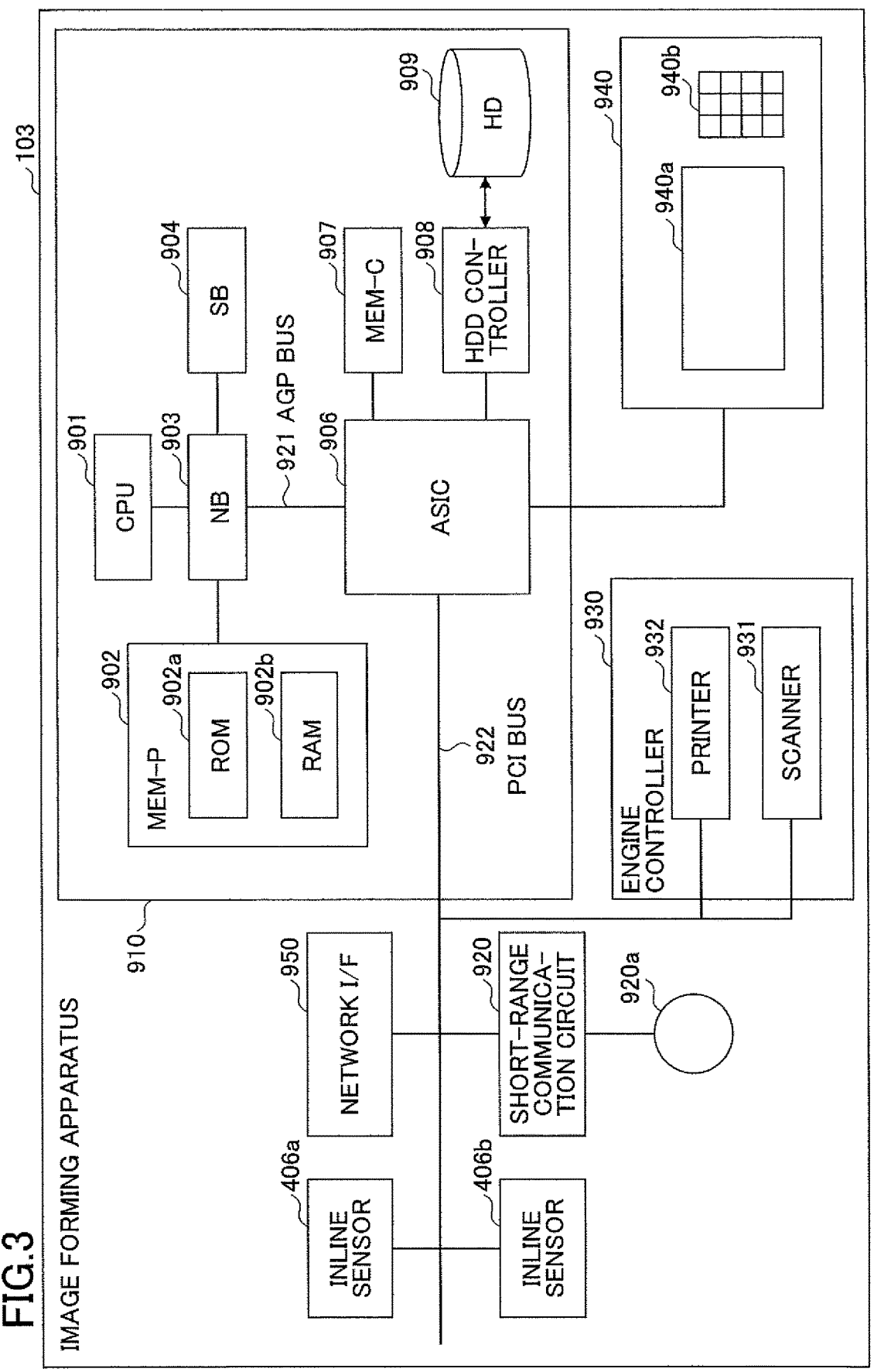
FIG. 3 is a block diagram illustrating an example of a hardware configuration of the image forming apparatus according to one or more embodiments.

Hereafter, the hardware configuration of the image forming apparatus 103 will be described. FIG. 3 is a block diagram illustrating an example of the hardware configuration of the image forming apparatus 103. As illustrated in FIG. 3, the image forming apparatus 103 includes a controller 910, a short-range communication circuit 920, and an engine controller 930. The image forming apparatus 103 includes an operational panel 940, a network I/F (Interface) 950, the inline sensor 406a, and the inline sensor 406b.

The controller 910 includes a central processing unit (CPU) 901 as a main unit of a computer; a system memory (MEM-P) 902; a north bridge (NB) 903; a south bridge (SB) 904; and an application specific integrated circuit (ASIC) 906. The controller 910 includes a local memory (MEM-C) 907 as a storage; a hard disk drive (HDD) controller 908; and a hard disk (HD) 909 as a storage. Note that instead of the HD 909, a solid state drive (SSD) may be used. The NB 903 and the ASIC 906 are connected via an accelerated graphics port (AGP) bus 921.

The CPU 901 is a control unit that performs the entire control of the image forming apparatus 103. The NB 903 is a bridge for connecting the CPU 901, the MEM-P 902, the SB 904, and the AGP bus 921. The CPU 901 includes a memory controller for controlling the reading and writing, etc. of the MEM-P 902, and includes a peripheral component interconnect (PCI) master and an AGP target.

The MEM-P 902 includes a read only memory (ROM) 902a, which is a memory for storing one or more programs and data for implementing functions of the controller 910, and includes a random access memory (RAM) 902b, which is used as a memory for expanding one or more programs and data and for rendering in printing.

Note that the programs stored in the ROM 902a may be recorded onto a computer-readable recording medium in an installable format file or an executable format file to be provided. The computer-readable recording medium includes a CD (compact disk)-ROM, a CD-R (recordable), a digital versatile disk (DVD), or the like.

The SB 904 is a bridge for connecting the NB 903 to a PCI device and a peripheral device. The ASIC 906 is an integrated circuit (IC) for image processing, which includes one or more hardware components for image processing. The ASIC 906 serves as a bridge that connects the AGP bus 921, a PCI bus 922, the HDD controller 908, and the MEM-C 907.

The ASIC 906 includes a PCI target, an AGP master, and an arbitrator (ARB) that forms a core of the ASIC 906. The ASIC 906 includes a memory controller that controls the MEM-C 907, and includes a plurality of direct memory access controllers (DMACs) each of which performs processing such as rotation processing of image data by a hardware logic or the like. The ASIC 906 includes a PCI unit that transfers data between a scanner 931 and a printer 932, via the PCI bus 922.

Note that a USB interface or an interface based on IEEE 1394 (Institute of Electronic and Electronic Engineers 1394) may be connected to the ASIC 906.

The MEM-C 907 is a local memory used as an image buffer for copying and a code buffer. The HD 909 is a storage that stores image data, font data used in printing, and a foam. Under the control of the CPU 901, the reading of data from the HD 909; and the writing of data to the HD 909 are controlled.

The AGP bus 921 is a bus interface for graphics accelerator cards, which is proposed to accelerate graphics processing. The AGP bus 921 directly accesses the MEM-P 902 with high throughput to allow high speed processing for the graphics accelerator card.

The short-range communication circuit 920 is provided with a short-range communication circuit 920a. The short-range communication circuit 920 is a communication circuit such as near field communication (NFC), Bluetooth (registered trademark), or the like.

The engine controller 930 includes the scanner 931 and the printer 932. The operational panel 940 includes a panel display 940a and an operational panel 940b. The panel display 940a includes a touch panel or the like, which displays a present setting value, a selection screen, or the like and receives input from an operator. The operational panel 940b includes a numeric keypad, a start key, and the like. The numeric keypad is used to input a setting value as a condition about image formation, where the condition includes a condition for setting an image density, and the like.

The controller 910 controls the entire image forming apparatus 103 and controls, for example, the rendering; communication; input through the operational panel 940; and the like. Each of the scanner 931 and the printer 932 performs image processing relating to error diffusion, gamma conversion, and the like.

Note that for the image forming apparatus 103, a document box function, a copy function, a print function, and a facsimile function are sequentially switched through an application switching key included in the operational panel 940, and a target function can be selected accordingly.

When the document box function is selected, the image forming apparatus 103 is in a document box mode. When the copy function is selected, the image forming apparatus 103 is in a copy mode. When the print function is selected, the image forming apparatus 103 is in a print mode. When the facsimile mode is selected, the image forming apparatus 103 is in a facsimile mode.

The network I/F 950 is an interface for performing data communication using a network. The short-range communication circuit 920 and the network I/F 950 are each electrically connected to the ASIC 906 via the PCI bus 922.

Each of the inline sensor 406a and the inline sensor 406b is electrically connected to the ASIC 906 via the PCI bus 922.

<Hardware Configuration of the Computer>

Hereafter, the hardware configuration of the computer 105 used in the image forming system 100 will be described.

Figure 4:
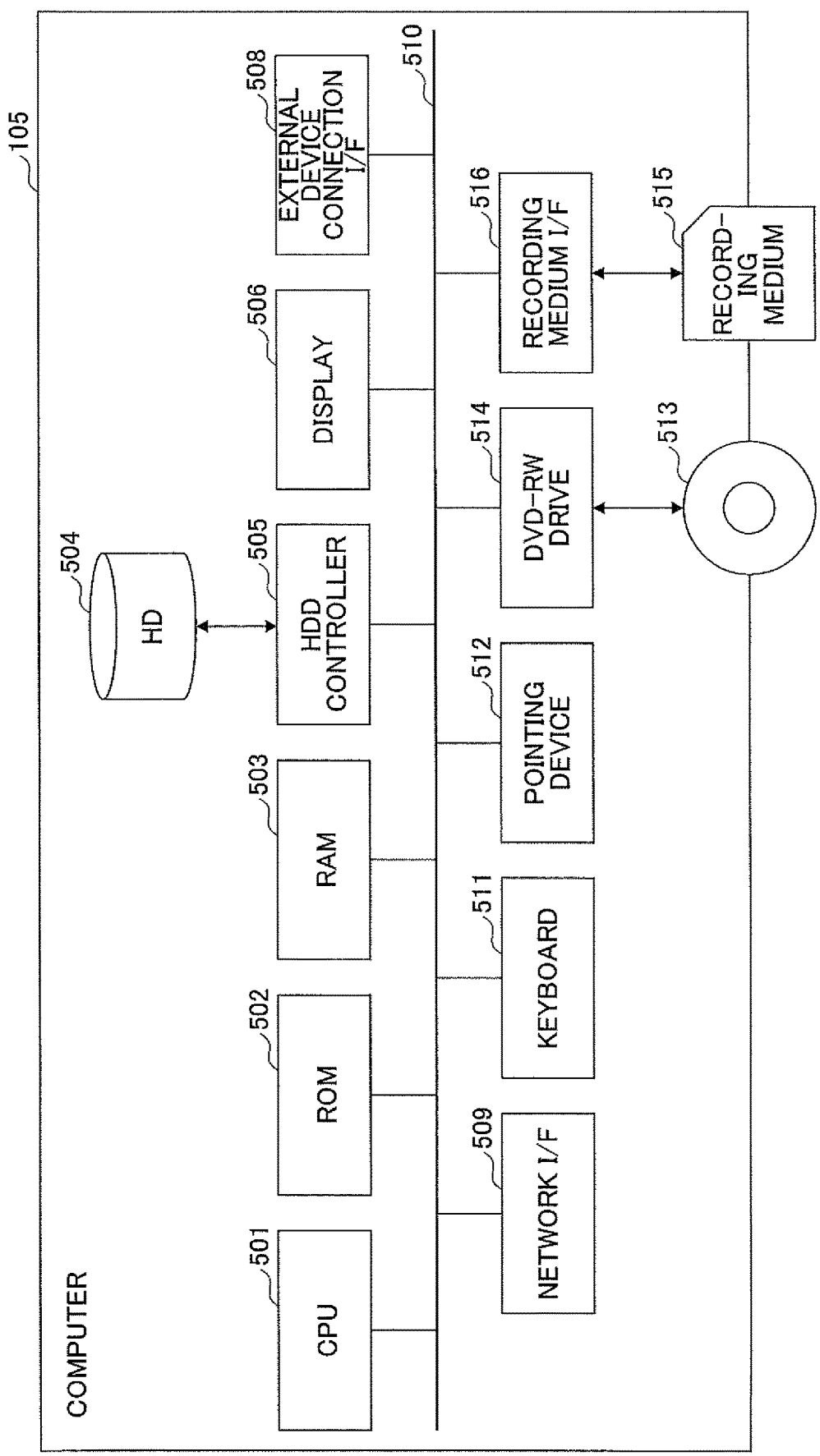
FIG. 4 is a block diagram illustrating an example of a hardware configuration of a computer according to one or more embodiments.

FIG. 4 is a block diagram illustrating an example of the hardware configuration of the computer 105. The computer 105 illustrated in FIG. 4 is used as each of the client PC 101, the DFE 102, and the management server 104 in the image forming system 100.

As illustrated in FIG. 4, the computer 105 includes a CPU 501, a ROM 502, a RAM 503, a hard disk (HD) 504, and a hard disk drive (HDD) controller 505. Note that instead of the HD 909, a solid state drive (SSD) may be used. The computer 105 includes a display 506, an external device connection I/F 508, a network I/F 509, and a data bus 510. The computer 105 includes a keyboard 511, a pointing device 512, a digital versatile disk rewritable (DVD-RW) drive 514, and a recording medium I/F 516.

The CPU 501 controls the operation of the entire computer 105. The ROM 502 stores a program such as an initial program loader (IPL), which is used to drive the CPU 501. The RAM 503 is used as a work area of the CPU 501.

The HD 504 stores various data, including one or more programs, and the like. Under the control of the CPU 501, the HDD controller 505 controls the reading of various data from the HD 504; and the writing of various data to the HD 504. The display 506 displays various information such as a cursor, menus, windows, characters, and images.

The external device connection I/F 508 is an interface for connecting various external devices. In this case, the external devices include a universal serial bus (USB) memory, a printer, and the like. The network I/F 509 is an interface for performing data communication using a network. The data bus 510 is an address bus, a data bus, or the like, which is for electrically connecting components such as the CPU 501.

The keyboard 511 is an input device having a plurality of keys for inputting characters, numbers, various instructions, and the like. The pointing device 512 is an input device for selecting and executing of various instructions; selecting a processed target; moving the cursor; and the like.

The DVD-RW drive 514 controls the reading of various data from the DVD-RW 513; and the writing of various data to the DVD-RW 513. The DVD-RW 513 is an example of a removable recording medium. Note that instead of the DVD-RW 513, a DVD-R or the like may be used. The reading of data from a recording medium 515 such as a flash memory; and the writing (storing) of data to the recording medium 515 are controlled via the recording medium I/F 516.

<Functional Configuration of the DFE According to the First Embodiment>

Figure 5:
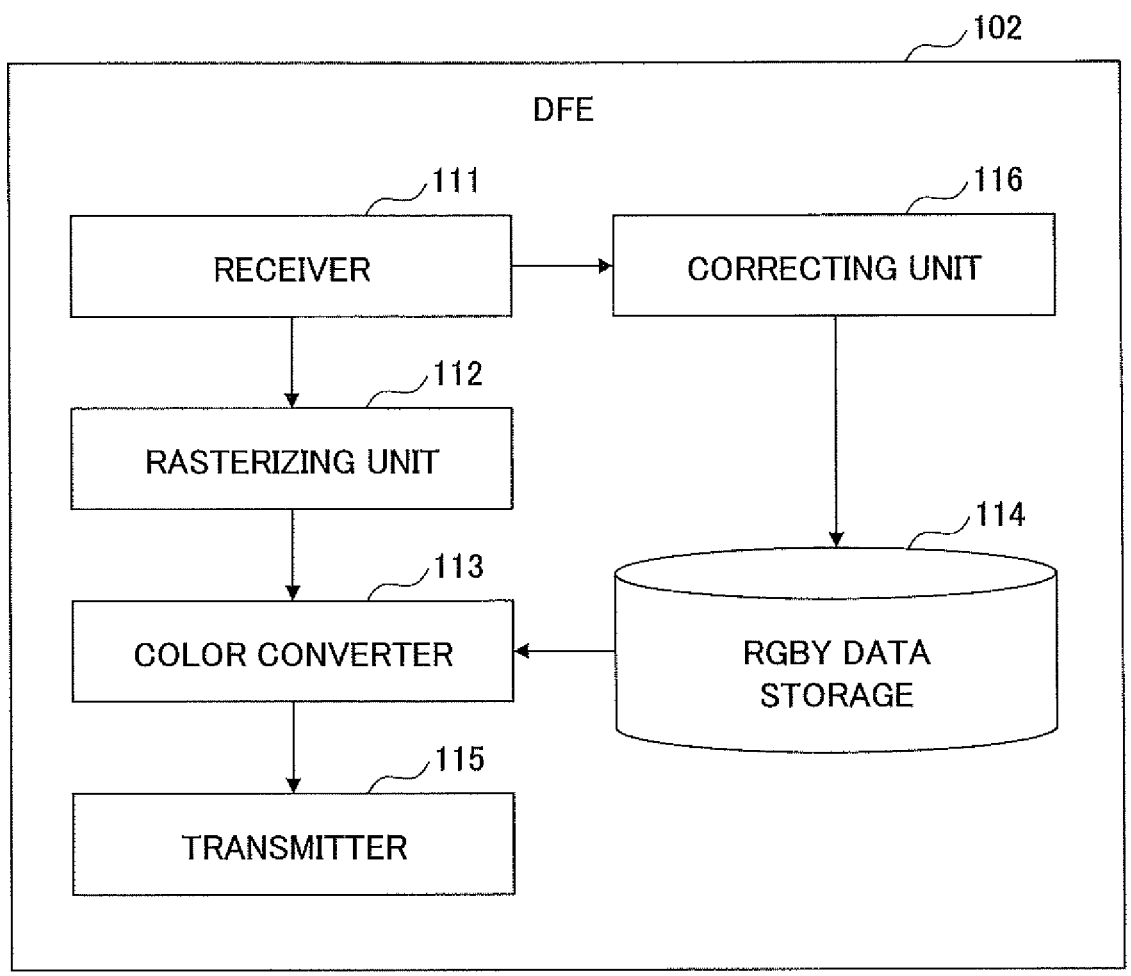
FIG. 5 is a block diagram illustrating an example of a functional configuration of a DFE according to a first embodiment.

Hereafter, the functional configuration of the DFE 102 according to the first embodiment will be described. FIG. 5 is a block diagram illustrating an example of the functional configuration of the DFE 102. As illustrated in FIG. 5, the DFE 102 includes a receiver 111; a rasterizing unit 112; a color converter 113; an RGBY data storage 114; a transmitter 115; and a correcting unit 116.

The receiver 111 receives the print job generated by the client PC 101 and outputs the print job to the rasterizing unit 112. The receiver 111 receives, from the image forming apparatus 103, color information of the printed image acquired by a reading unit 126 (FIG. 6), and outputs the color information to the correcting unit 116.

The print job received by the receiver 111 is associated with image data to be printed on the print medium; print condition information including information for indicating single-sided printing or two-sided printing; and print medium type information corresponding to the thickness and basis weight of a given print medium. With use of a printer driver installed on the client PC 101, a print condition and a print medium type are set through a setting screen displayed on the display 506 (see FIG. 4) of the client PC 101 that is used by a print user.

The rasterizing unit 112 converts image data associated with the print job into raster data to thereby generate rendering data, and outputs the generated rendering data to the color converter 113.

The color converter 113 converts the rendering data from the rasterizing unit 112 into rendering data in a CMYK format. Note, however, that when the rendering data is originally in the CMYK format (hereinafter referred to as CMYK rendering data), the conversion is not performed. The color converter 113 performs gradation conversion of the CMYK rendering data, with reference to one or more gamma curves stored in the RGBY data storage 114. A gamma curve refers to data indicating the relationship between a colored gradation value for rendering data and print color (print density) on a given print medium.

When print color provided by the image forming apparatus 103 alters over time due to the image formation units 403 that change over time, the gamma curves stored in the RGBY data storage 114 may be each deviated from an actually measured relationship between a colored value and print color. When the gamma curve is shifted from the actual relationship, gradation conversion for each colored gradation value cannot be match a desired print color.

In this regard, based on color information acquired by the reading unit 126 (see FIG. 6), the correcting unit 116 corrects the deviation, from the actual relationship, of the gamma curve stored in the RGBY data storage 114 in order to allow each colored gradation value to match a desired print color. The correcting unit 116 converts RGB color information obtained from the reading unit 126 through the receiver 111, into CMYK color information. The correcting unit 116 uses the converted CMYK color information to generate the gamma curve. The gamma curve stored in the RGBY data storage 114 is replaced with the generated gamma curve. In such a manner, the correcting unit 116 can correct the gamma curve. Note that the correcting unit 116 may rewrite a part of the gamma curve stored in the RGBY data storage 114 to thereby correct the gamma curve.

A raster image processor (RIP) engine includes the rasterizing unit 112 and the color converter 113. The rendering data generated by the RIP engine is transmitted to the image forming apparatus 103 via the transmitter 115. The print condition information and the print medium type information, as well as the rendering data, are, transmitted to the image forming apparatus 103 via the transmitter 115.

<Functional Configuration of the Image Forming Apparatus According to the First Embodiment>

Figure 6:
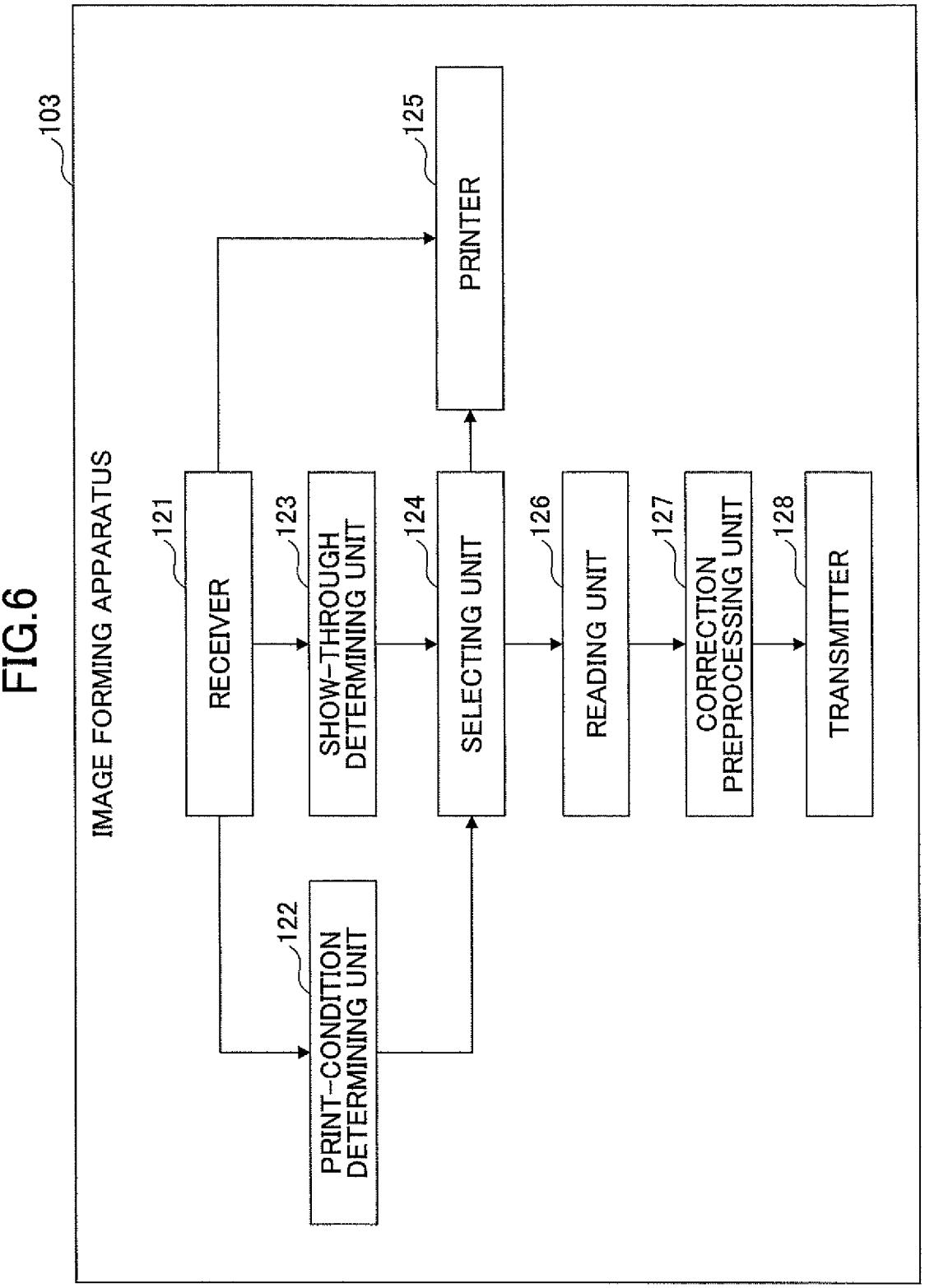
FIG. 6 is a block diagram illustrating an example of a functional configuration of an image forming apparatus according to the first embodiment.

Hereafter, the functional configuration of the image forming apparatus 103 according to the first embodiment will be described. FIG. 6 is a block diagram illustrating an example of the functional configuration of the image forming apparatus 103. As illustrated in FIG. 6, the image forming apparatus 103 includes a receiver 121, a print-condition determining unit 122, a show-through determining unit 123, and a selecting unit 124. The image forming apparatus 103 includes a printer 125, a reading unit 126, a correction preprocessing unit 127, and a transmitter 128.

The print-condition determining unit 122, the show-through determining unit 123, the selecting unit 124, and the correction preprocessing unit 127 are implemented when the CPU 901 in FIG. 3 executes a predetermined program. The printer 125 includes the image formation units 403; the intermediate transfer belt 402; the second transfer rollers 404; the pair of conveyance rollers 401; the fixing rollers 405; the reverse path 407; and the like. The reading unit 126 is implemented by the inline sensor 406a, the inline sensor 406b, and the like.

The receiver 121 outputs the rendering data, the print condition information, and the print medium type information that are received from the DFE 102, to each of the print-condition determining unit 122, the show-through determining unit 123, and the printer 125.

Based on the print condition information from the receiver 121, the print-condition determining unit 122 determines whether a print condition includes two-sided printing on the first side and the second side of the print medium. Then, the print-condition determining unit 122 outputs a determined result to the selecting unit 124.

Based on the print medium type information from the receiver 121, the show-through determining unit 123 determines whether show-through occurs when the image forming apparatus 103 prints on both sides of the two-sided print medium. Then, the show-through determining unit 123 outputs a determined result to the selecting unit 124. In this description, the show-through means a phenomenon of an image printed on one side of a print medium that is transmitted through the other side of the print medium, and that is also read when the image printed on the other side of the print medium is read.

More show-through occurs with thinner print medium, and more show-through occurs with less basis weight of the print medium. The thickness and basis weight of the print medium are associated with the print medium type. In view of the relation, the show-through determining unit 123 can determine whether show-through occurs based on the print medium type information (which is an example of a predetermined condition).

For example, when the basis weight of the print medium is less than 80.0 $g/m^2$, the show-through determining unit 123 may determine that show-through occurs while the image forming apparatus 103 prints on two sides of the print medium.

In the present embodiment, when the basis weight of the print medium to be printed on two sides is less than or equal to a predetermined basis weight, the show-through determining unit 123 may determine that show-through occurs.

When the basis weight of the print medium is 80.0 $g/m^2$ or more, the show-through determining unit 123 may determine that show-through does not occur while the image forming apparatus 103 prints on two sides of the print medium.

Note that the condition under which the show-through determining unit 123 determines that show-through occurs is not limited to the example described above. When the basis weight of the print medium is less than 70.0 $g/m^2$, the show-through determining unit 123 may determine that show-through occur.

In the present embodiment, when the basis weight of the print medium to be printed on two sides is greater than a predetermined basis weight, the show-through determining unit 123 may determine that show-through does not occur.

In addition to the print medium type information, the show-through determining unit 123 may determine whether show-through occurs, based on the image formed on the print medium. For example, even when the basis weight of the print medium is decreased or the print medium is thin, in a case where the density of the image formed on the print medium is less than a predetermined density, the show-through determining unit 123 may determine that show-through does not occur. In other words, the show-through determining unit 123 may determine whether show-through occurs based on the print medium type information and the rendering data (which is an example of image data) received from the DFE 102.

Based on the determined results at the print-condition determining unit 122 and the show-through determining unit 123, the selecting unit 124 selects one side among the first side and the second side of the print medium, as a target side (hereinafter referred to as a read side) of the print medium where color information of the printed image is to be acquired by the reading unit 126.

Specifically, when the print-condition determining unit 122 determines that two-sided printing is not provided (single-sided printing is provided), the selecting unit 124 selects the first side of the print medium, as the read side. When the print-condition determining unit 122 determines that two-sided printing is provided, and the show-through determining unit 123 determines that show-through occurs, the selecting unit 124 selects the first side of the print medium, as the read side. Further, when the print-condition determining unit 122 determines that two-sided printing is provided, and the show-through determining unit 123 determines that show-through does not occur, the selecting unit 124 selects the first side and the second side of the print medium, as the read sides. The selecting unit 124 outputs the selected result to each of the printer 125 and the reading unit 126.

The printer 125 prints on the print medium based on the rendering data from the receiver 121. The printer 125 prints on the first side and the second side of the print medium, at a timing that is determined by the selecting unit 124, the timing corresponding to one or more read sides of the print medium.

Specifically, in single-sided printing, when the selecting unit 124 selects the first side of the print medium as the read side, the printer 125 prints on the first side only. In two-sided printing, when the selecting unit 124 selects the first side of the print medium as the read side, the printer 125 prints on the first side; subsequently, the reading unit 126 acquires color information of the image printed on the first side of the print medium, and then the printer 125 prints on the second side of the print medium. Further, in two-sided printing, when the selecting unit 124 selects the first side and the second side of the print medium, as the read sides, the printer 125 prints on the first side and the second side of the print medium, before the reading unit 126 acquires color information of the images printed on the first side and the second side of the print medium.

The reading unit 126 acquires color information of the image printed on one or more read sides of the print medium, and outputs the acquired color information to the correction preprocessing unit 127.

Specifically, in single-sided printing, when the selecting unit 124 selects the first side of the print medium as the read side, the reading unit 126 acquires color information of the image printed on the first side of the print medium. In two-sided printing, when the selecting unit 124 selects the first side of the print medium as the read side, the reading unit 126 acquires color information of the image printed on the first side of the print medium, after printing on the first side of the print medium is provided and before printing on the second side of the print medium is provided. In this case, the color information acquired by the reading unit 126 is temporarily stored in the RAM 902b in FIG. 3. Then, after printing on the second side of the print medium is provided, the temporarily stored color information is retrieved from the RAM 902b and is then output to the correction preprocessing unit 127.

In two-sided printing, when the selecting unit 124 selects the first side and the second side of the print medium, as the read sides, the reading unit 126 acquires color information of the respective images printed on the first side and the second side of the print medium, after printing on both sides, being the first side and the second side, of the print medium is provided.

In other words, in two-sided printing on the first side and the second side of the print medium, when show-through is determined to occur, the reading unit 126 acquires color information of the image printed on the first side of the print medium, after printing on the first side of the print medium is provided and before printing on the second side of the print medium is provided. In two-sided printing on the first side and the second side of the print medium, when show-through is determined not to occur, the reading unit 126 acquires color information of the respective images printed on the first side and the second side of the print medium, after printing on the first side and the second side of the print medium is provided.

Note that the selecting unit 124 may include functions of the show-through determining unit 123.

In the preprocess for gamma curve correction, the correction preprocessing unit 127 performs a process of eliminating a difference between pieces of color information from the reading unit 126, the difference being caused by variation between the inline sensors. Then, the correction preprocessing unit 127 transmits the preprocessed color information to the DFE 102, through the transmitter 128.

<Print Command Process by the DFE According to the First Embodiment>

Figure 7:
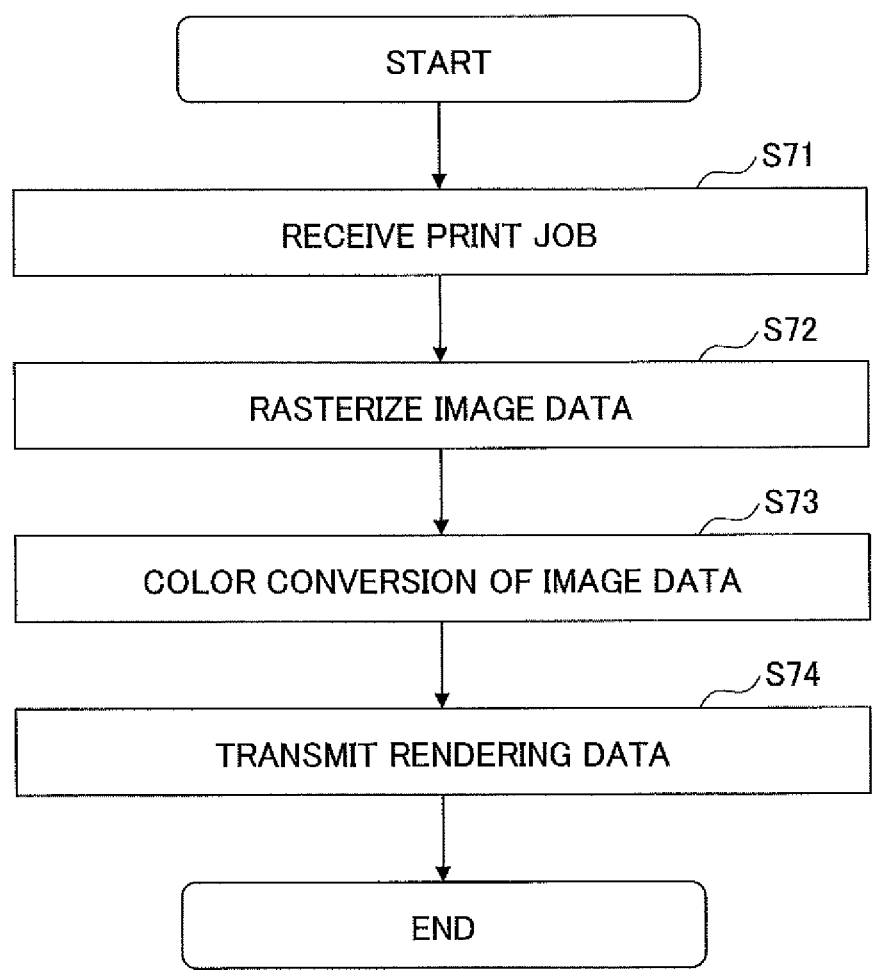
FIG. 7 is a flowchart illustrating an example of a printing process by the DFE according to the first embodiment.

Hereafter, the print command process by the DFE 102 according to the first embodiment will be described. FIG. 7 is a flowchart illustrating an example of the print command process by the DFE 102.

First, in step S71, the receiver 111 receives the print job generated by the client PC 101 and then outputs the print job to the rasterizing unit 112.

In step S72, the rasterizing unit 112 converts image data associated with the print job into raster data to thereby generate rendering data, and then outputs the generated rendering data to the color converter 113.

In step S73, the color converter 113 converts the rendering data from the rasterizing unit 112 into CMYK rendering data. The color converter 113 performs gradation conversion of the CMYK rendering data, with reference to the gamma curve stored in the RGBY data storage 114. The color converter 113 then outputs the converted rendering data to the transmitter 115.

In step S74, the transmitter 115 transmits the rendering data to the image forming apparatus 103. The transmitter 115 also transmits print condition information and print medium type information to the image forming apparatus 103.

In such a manner, the DFE 102 transmits the rendering data, the print condition information, and the print medium type information to the image forming apparatus 103, and can send a print command to the image forming apparatus 103.

<Operation for Acquisition of Color Information by the Image Forming Apparatus According to the First Embodiment>

Figure 8:
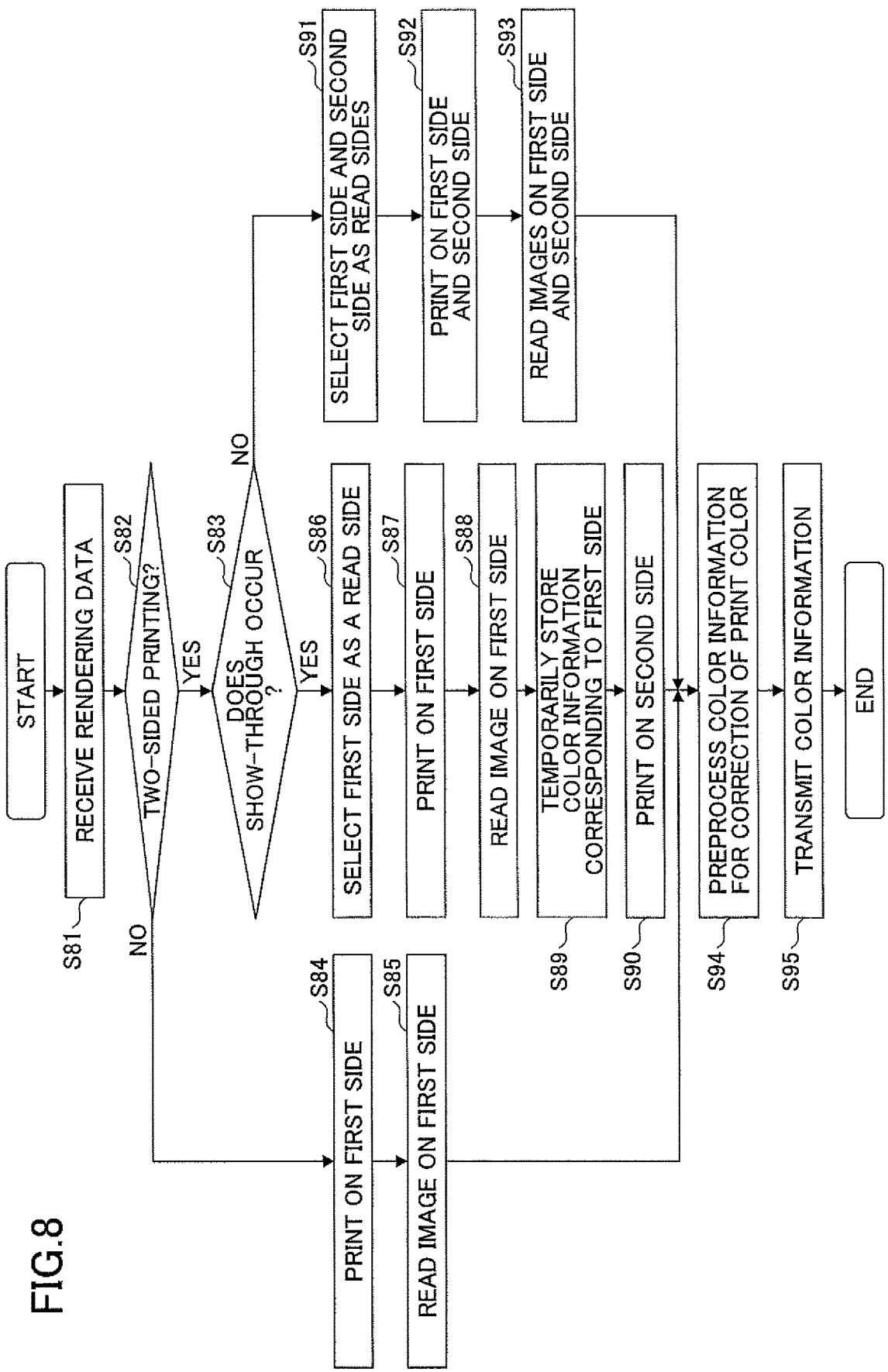
FIG. 8 is a flowchart illustrating an example of the operation of the image forming apparatus according to the first embodiment.

Hereafter, the operation for acquisition of color information performed by the image forming apparatus 103 according to the first embodiment will be described. FIG. 8 is a flowchart illustrating an example of the operation for acquisition of color information by the image forming apparatus 103 according to the first embodiment.

First, in step S81, the receiver 121 outputs the rendering data, the print condition information, and the print medium type information that are received from the DFE 102, to each of the print-condition determining unit 122, the show-through determining unit 123, and the printer 125.

In step S82, the print-condition determining unit 122 determines whether the print condition includes two-sided printing on the first side and the second side of the print medium, based on the print condition information.

In step S82, when the print condition is determined not to include two-sided printing (No in the step), in step S84, the printer 125 prints on the first side of the print medium.

In step S85, the reading unit 126 reads the image printed on the first side of the print medium to thereby acquire color information of the printed image. Next, the reading unit 126 outputs the acquired color information to the correction preprocessing unit 127. Then, the process proceeds to step S94.

In contrast, in step S82, when the print condition is determined to include two-sided printing (Yes in the step), in step S83, the show-through determining unit 123 determines whether show-through occurs based on the print medium type information.

In step S83, when show-through is determined to occur (Yes in the step), in step S86, the selecting unit 124 selects the first side of the print medium as the read side.

In step S87, the printer 125 prints on the first side of the print medium.

In step S88, the reading unit 126 reads the image printed on the first side of the print medium to thereby acquire color information of the printed image.

In step S89, the RAM 902*b* temporarily stores the color information acquired by the reading unit 126.

In step S90, the printer 125 prints on the second side of the print medium. After printing on the second side of the print medium is provided, the temporarily stored color information is retrieved from the RAM 902*b* and is output to the correction preprocessing unit 127. Then, the process proceeds to step S94.

Note that in step S83, when show-through is determined to occur, the print color is corrected using only the color information of the image printed on the first side of the print medium, without reading the image printed on the second side of the print medium through the reading unit 126.

In step S83, when show-through is determined not to occur (No in the step), in step S91, the selecting unit 124 selects the first side and the second side of the print medium, as the read sides.

In step S92, the printer 125 prints on both sides, being the first side and the second side, of the print medium.

In step S93, the reading unit 126 reads the images printed on the first side and the second side of the print medium to thereby acquire color information of the printed images. The acquired color information is output to the correction preprocessing unit 127. Then, the process proceeds to step S94.

In step S94, the correction preprocessing unit 127 performs the preprocess for gamma curve correction. In the preprocess, the correction preprocessing unit 127 performs the process of eliminating a difference between pieces of color information received from the reading unit 126, the difference being caused by variation between the inline sensors. The correction preprocessing unit 127 outputs the preprocessed color information to the transmitter 128.

In step S95, the transmitter 128 transmits the preprocessed color information to the DFE 102, the preprocessed color information being received from the correction preprocessing unit 127.

In such a manner, the image forming apparatus 103 can acquire the color information of one or more images printed on the print medium to thereby transmit the color information to the DFE 102.

<Correction Process of Print Color by the DFE According to the First Embodiment>

Figure 9:
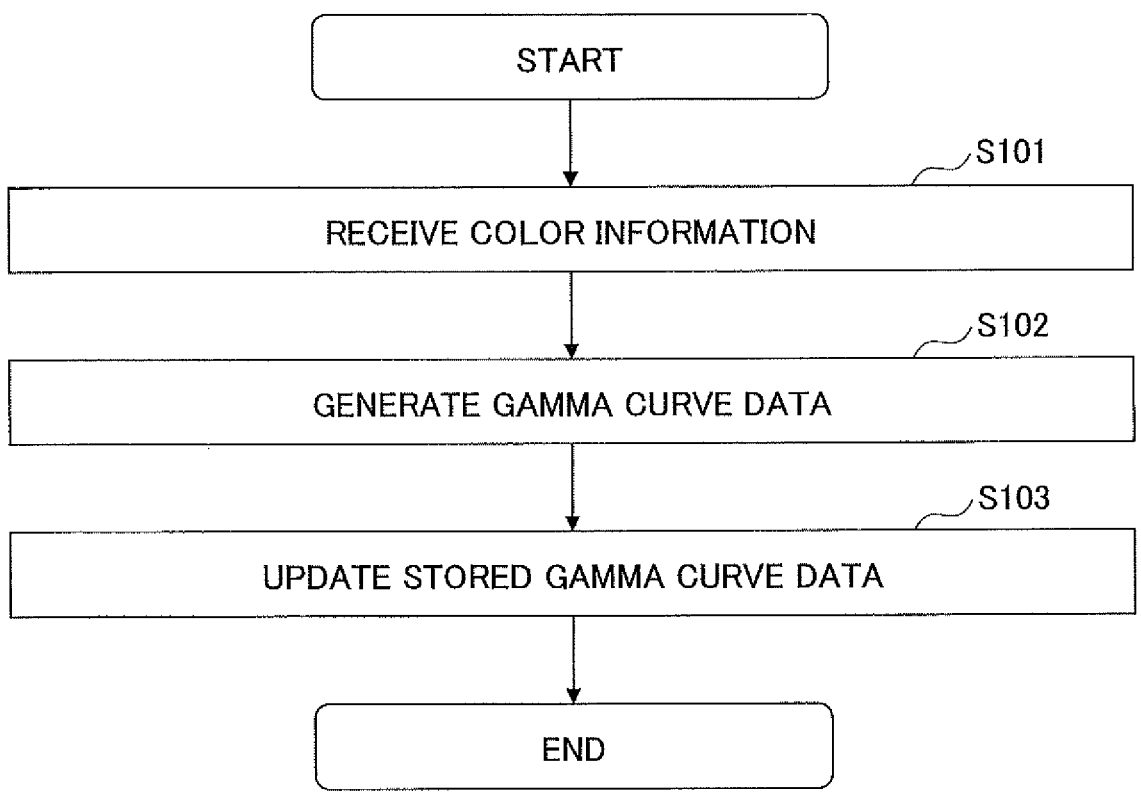
FIG. 9 is a flowchart illustrating an example of a correction process by the DFE according to the first embodiment.

Hereafter, the correction process of the print color according to the DFE 102 according to the first embodiment will be described. FIG. 9 is a flowchart illustrating an example of the correction process of the print color by the DFE 102.

First, in step S101, the receiver 111 receives, from the image forming apparatus 103, the color information acquired by the reading unit 126 and outputs the color information to the correcting unit 116.

In step S102, the correcting unit 116 converts the RGB color information acquired by the reading unit 126, into CMYK color information to thereby generate the gamma curve based on the CMYK color information.

In step S103, the correcting unit 116 replaces the gamma curve stored in the RGBY data storage 114, with the generated gamma curve.

In such a manner, the DFE 102 can correct the gamma curve.

<Effects of the First Embodiment>

As described above, according to the present embodiment, in two-sided printing of the print medium, when show-through is determined to occur, the color information of the image printed on the first side of the print medium is acquired after printing on the first side of the print medium is provided and before printing on the second side of the print medium is provided. In this case, when the color information of the image printed on the first side of the print medium is acquired, bleeding-though does not occur because printing on the second side of the print medium is not yet provided. Thereby, the color information of the image printed on the print medium can be appropriately acquired without being affected by the bleeding-though. In addition, the color information of color used in the printed image can be acquired appropriately. Accordingly, the print color can be appropriately corrected based on the acquired color information.

Second Embodiment

Hereafter, an image forming system according to the second embodiment will be described. Note that explanation for the same configuration as described in the embodiments will be omitted.

In the first embodiment, as an example, the image forming apparatus 103 includes the print-condition determining unit 122, the show-through determining unit 123, and the selecting unit 124. However, the present embodiment will be described using a case where the DFE 102a includes the above units.

Figure 10:
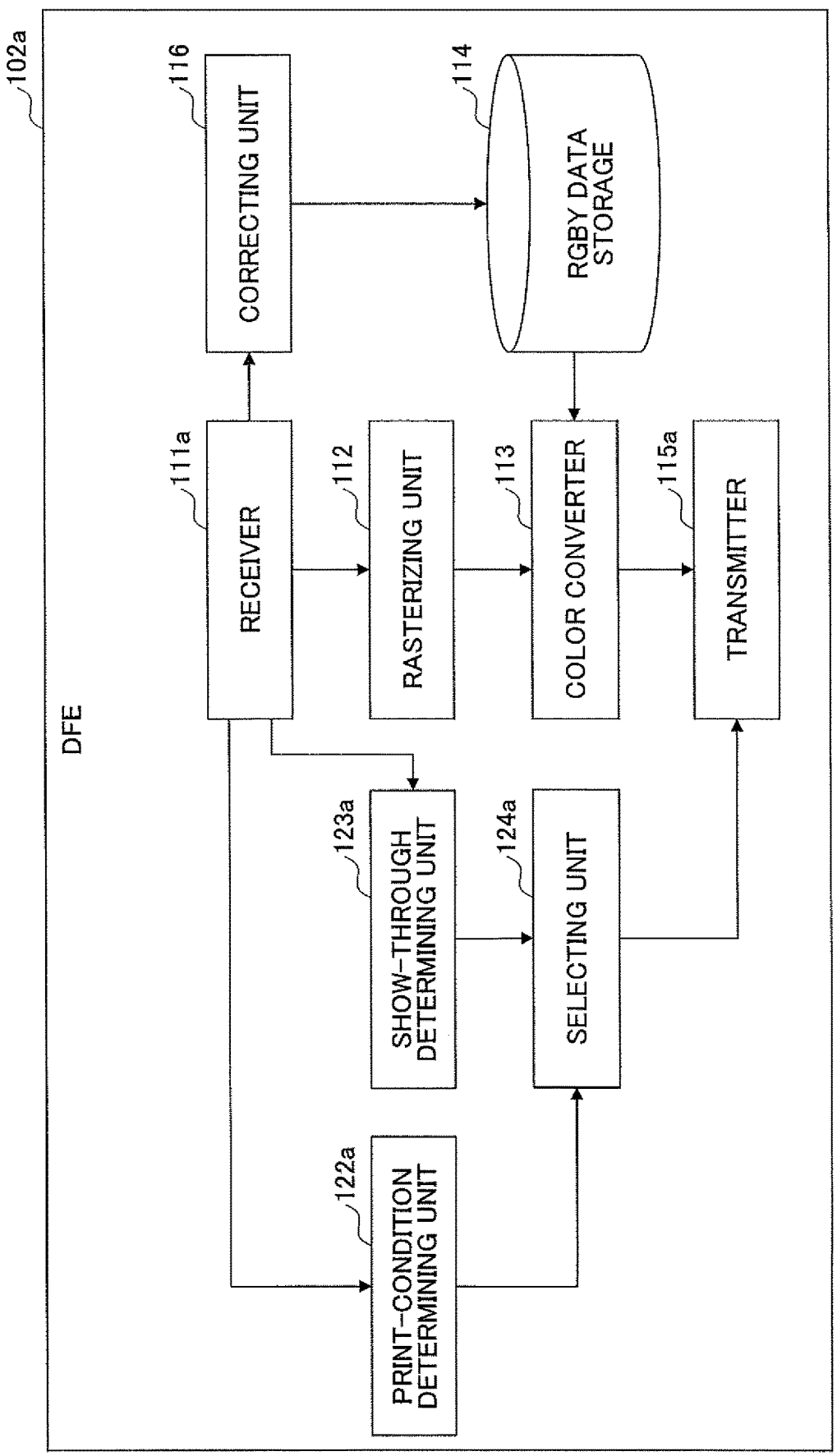
FIG. 10 is a block diagram illustrating an example of a functional configuration of a DFE according to a second embodiment.

FIG. 10 is a block diagram illustrating an example of the functional configuration of the DFE 102a provided in the image forming system according to the present embodiment. As illustrated in FIG. 10, the DFE 102a includes a receiver 111a, a print-condition determining unit 122a, a show-through determining unit 123a, a selecting unit 124a, and a transmitter 115a.

The receiver 111a receives the print job generated by the client PC 101, and outputs the print job to each of the rasterizing unit 112, the print-condition determining unit 122a, and the show-through determining unit 123a.

Based on received print condition information, the print-condition determining unit 122a determines whether the print condition includes two-sided printing on the first side and the second side of the print medium. Then, the print-condition determining unit 122 outputs a determined result to the selecting unit 124a.

Based on received print medium type information, the show-through determining unit 123a determines whether show-through occurs when the image forming apparatus 103 prints on two sides on the print medium. Then, the show-through determining unit 123a outputs a determined result to the selecting unit 124a.

The selecting unit 124a selects, as the read side, at least one side among the first side and the second side of the print medium, based on the determined result at the print-condition determining unit 122a and the show-through determining unit 123a, and outputs a selected result to the transmitter 115a.

The transmitter 115a outputs the rendering data, information corresponding to one or more read sides, and print mode information indicating whether two-sided printing is provided or not, to the image forming apparatus 103a.

Figure 11:
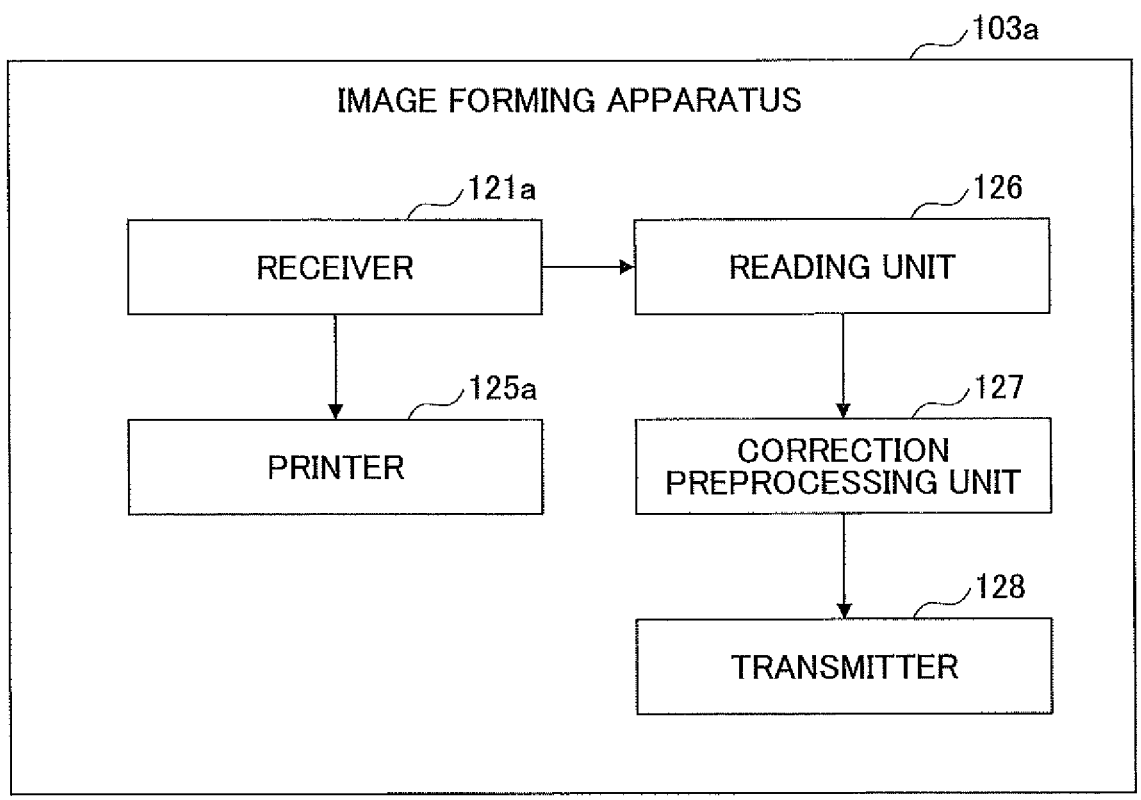
FIG. 11 is a block diagram illustrating an example of a functional configuration of an image forming apparatus according to the second embodiment.

FIG. 11 is a block diagram illustrating an example of the functional configuration of the image forming apparatus 103a provided in the image forming system according to the present embodiment. As illustrated in FIG. 11, the image forming apparatus 103a includes a receiver 121a and a printer 125a.

The receiver 121a outputs the rendering data, the information corresponding to one or more read sides, and the print mode information that are received from the DFE 102a, to each of the printer 125a and the reading unit 126.

The printer 125a prints on the print medium based on the rendering data. The printer 125a prints on the first side and the second side of the print medium, at a timing corresponding to one or more selected read sides.

Figure 12:
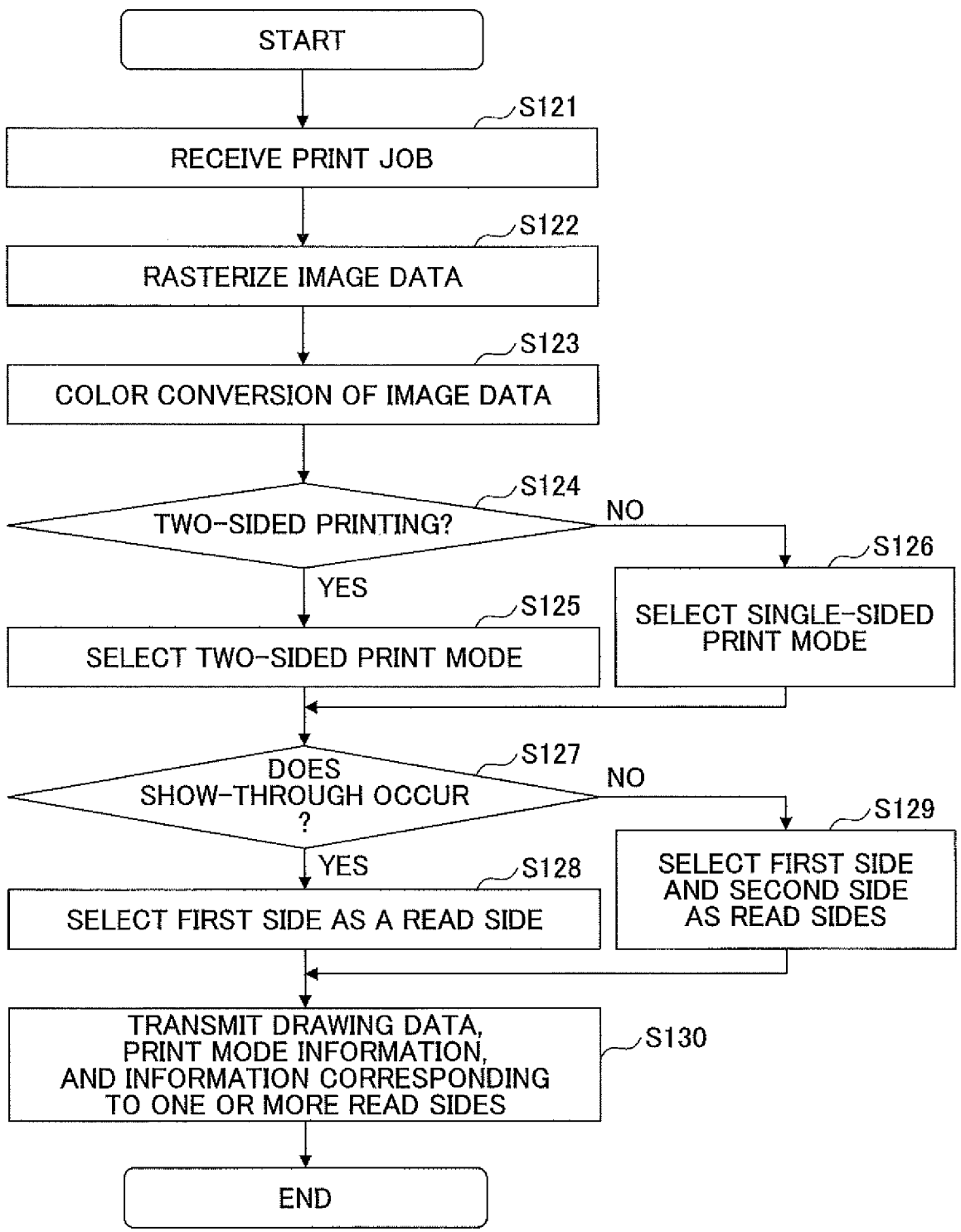
FIG. 12 is a flowchart illustrating an example of a printing process by the DFE according to the second embodiment.

FIG. 12 is a flowchart illustrating an example of a print command process by the DFE 102a according to the present embodiment.

First, in step S121, the receiver 111a receives the print job generated by the client PC 101, and then outputs the print job to each of the rasterizing unit 112, the print-condition determining unit 122a, and the show-through determining unit 123a.

In step S122, the rasterizing unit 112 converts the image data associated with the print job into raster data to thereby generate rendering data, and outputs the generated rendering data to the color converter 113.

In step S123, the color converter 113 converts the rendering data from the rasterizing unit 112, into CMYK rendering data. The color converter 113 performs gradation conversion of the CMYK rendering data, with reference to the gamma curve stored in the RGBY data storage 114. Then, the color converter 113 outputs the converted rendering data to the transmitter 115.

In step S124, the print-condition determining unit 122a determines whether the print condition includes two-sided printing on the first side and the second side of the print medium, based on the print condition information.

In step S124, when the print condition is determined to include two-sided printing (Yes in the step), in step S125, the print-condition determining unit 122a selects a two-sided print mode as a print mode. In contrast, when the print condition is determined not to include two-sided printing (No in step S124), in step S126, the print-condition determining unit 122a selects a single-sided print mode as a print mode.

In step S127, based on the print medium type information, the show-through determining unit 123a determines whether show-through occurs while the image forming apparatus 103 prints on two sides of the print medium, to thereby output a determined result to the selecting unit 124a.

In step S127, when show-through is determined to occur (Yes in the step), in step S128, the selecting unit 124a selects the first side of the print medium as the read side. In contrast, in step S127, when show-through is determined not to occur (No in the step), in step S129, the selecting unit 124a selects the first side and the second side of the print medium, as the read sides.

In step S130, the transmitter 115a outputs the rendering data, information corresponding to one or more read sides of the print medium, and the print mode information to the image forming apparatus 103a.

In such a manner, the DFE 102a can transmit the rendering data, the print condition information, and the print medium type information to the image forming apparatus 103a to thereby send a print command to the image forming apparatus 103a.

Figure 13:
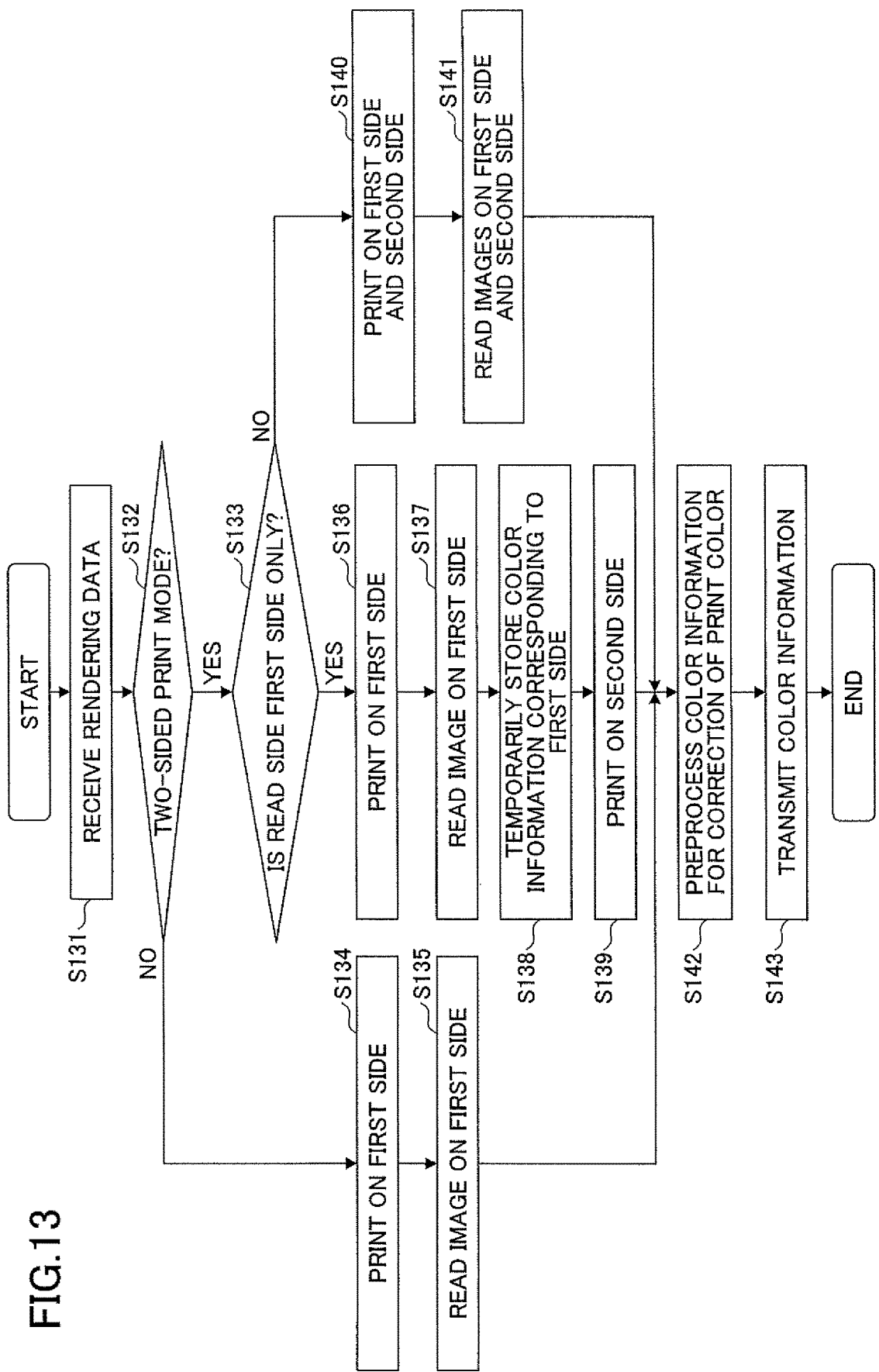
FIG. 13 is a flowchart illustrating an example of the operation of the image forming apparatus according to the second embodiment.

FIG. 13 is a flowchart illustrating an example of the operation for acquisition of color information by the image forming apparatus 103a.

First, in step S131, the receiver 121a outputs the rendering data, the information corresponding to one or more read sides of the print medium, and the two-sided print mode information that are received from the DFE 102a, to each of the printer 125a and the reading unit 126.

In step S132, the printer 125a determines whether the print mode is a two-sided print mode.

In step S132, when the print mode is determined not to be a two-sided print mode (No in the step), in step S134, the printer 125a prints on the first side of the print medium.

In step S135, the reading unit 126 reads the image printed on the first side of the print medium to thereby acquire color information of the image. The acquired color information is output to the correction preprocessing unit 127. Then, the process proceeds to step S141.

In contrast, in step S132, when the print mode is determined to be the two-sided mode (Yes in the step), in step S133, the printer 125a determines whether the read side is only the first side of the print medium.

In step S133, when the read side is determined to be only the first side of the print medium (Yes in the step), in step S136, the printer 125a prints on the first side of the print medium.

In step S137, the reading unit 126 reads the image printed on the first side of the print medium to thereby acquire color information of the printed image.

In step S138, the RAM 902b temporarily stores the color information acquired by the reading unit 126.

In step S139, the printer 125a prints on the second side of the print medium. After printing on the second side of the print medium is provided, the temporarily stored color information is retrieved from the RAM 902b and is output to the correction preprocessing unit 127. Then, the process proceeds to step S141.

In step S133, when show-through is determined not to occur (No in the step), in step S140, the printer 125a prints on the first side and the second side of the print medium.

In step S141, the reading unit 126 reads the respective images printed on the first side and the second side of the print medium to thereby acquire color information of the printed images. The acquired color information is output to the correction preprocessing unit 127. Then, the process proceeds to step S142.

The process in steps S142 and S143 is the same as the process described in steps S94 and S95 in FIG. 8; accordingly, the duplicate explanation for the steps may be omitted below.

In such a manner, the image forming apparatus 103a can acquire the color information of one or more images printed on the print medium to thereby transmit the color information to the DFE 102a.

As described above, according to the present embodiment, the DFE 102a includes the print-condition determining unit 122a, the show-through determining unit 123a, and the selecting unit 124a whereby it is possible to obtain the effects similar to the effects described in the first embodiment.

The embodiments have been described above, but the present disclosure is not limited to the embodiments specifically described above. Various modifications and modifications to the embodiments can be made without departing from the scope of the present disclosure.

Note that the image forming system 100 may include an external device having a part of functions of the image forming apparatus 103. The external device may have a part or all of functions of the DFE 102. As the external device, a cloud server or the like is used. The image forming apparatus 103 may have one or more functions of the DFE 102.

The embodiments have been described using the image forming system with the electrophotographic image forming apparatus. However, the embodiments can be applied to an image forming system that includes another image forming apparatus such as an inkjet image forming apparatus.

The embodiments also provide a non-transitory recording medium storing a program that, when executed by a computer, causes the computer to execute a method. The method includes determining whether show-through occurs in printing on both sides being a first side and a second side of a print medium opposite the first side; and, after printing on the first side of the print medium and before printing on the second side of the print medium, acquiring color information of an image printed on the first side of the print medium, upon a determination that show-through occurs in printing on both sides of the print medium. With such a recording medium, the same effects as described in the image forming system above can be obtained.

Each function described in the embodiments may be implemented by one or more processing circuits. The "processing circuit" used in this description covers a processor programmed to implement each function by computer software, as in a processor provided in an electronic circuit. The "processing circuit" also covers an application specific integrated circuit (ASIC), a digital signal processor (DSP), a field programmable gate array (FPGA), and a conventional circuit module, each of which is designed to implement each function described in the embodiments.

What is claimed is:
1. An image forming apparatus comprising:
a printer configured to print on a print medium; and
a reading unit configured to acquire color information of an image printed on the print medium,
wherein in printing on both sides being a first side and a second side of the print medium opposite the first side, upon a determination that a predetermined condition is met, the reading unit is configured to acquire the color information of the image printed on the first side of the print medium, after printing on the first side of the print medium is provided and before printing on the second side of the print medium is provided.

2. The image forming apparatus according to claim 1, further comprising:
- a print-condition determining unit configured to determine whether the predetermined condition being a print condition includes two-sided printing on the first side and the second side of the print medium;
- a show-through determining unit configured to determine whether the image printed on the first side of the print medium shows through the second side of the print medium, based on a second predetermined condition; and
- a selecting unit configured to select at least one side from among the first side and the second side of the print medium, as a print medium side on which the color information is acquired by the reading unit, based on a result determined by the print-condition determining unit and the show-through determining unit.

3. The image forming apparatus according to claim 2, wherein the second predetermined condition includes a print medium type, and
wherein the selecting unit is configured to select the print medium side on which the color information is acquired by the reading unit, based on the print medium type of the print medium.

4. The image forming apparatus according to claim 3, wherein the selecting unit is configured to select the first side of the print medium as the print medium side on which the color information is acquired by the reading unit, upon detecting that the print medium type indicates a print medium having a basis weight that is less than or equal to a predetermined basis weight.

5. The image forming apparatus according to claim 3, wherein the selecting unit is configured to select the first side and the second side of the print medium, as print medium sides on each of which the color information is acquired by the reading unit, upon detecting that the print medium type indicates a print medium having a basis weight that is greater than a predetermined basis weight.

6. The image forming apparatus according to claim 3, wherein the selecting unit is configured to select the print medium side on which the color information is acquired by the reading unit, based on the print medium type and image data.

7. A non-transitory recording medium storing a program that, when executed by a computer, causes the computer to execute a method, the method comprising:
- determining whether show-through occurs in printing on both sides being a first side and a second side of a print medium opposite the first side;
- after printing on the first side of the print medium and before printing on the second side of the print medium, acquiring color information of an image printed on the first side of the print medium, upon a determination that show-through occurs in printing on both sides of the print medium.

8. An image forming system comprising:
- an image forming apparatus;
- an image processing apparatus configured to transmit rendering data generated based on a print job to the image forming apparatus;
- a printer configured to print on a print medium; and
- a reading unit configured to acquire color information of an image printed on the print medium,
wherein in printing on both sides being a first side and a second side of the print medium opposite the first side, upon a determination that a predetermined condition is met, the reading unit is configured to acquire the color information of the image printed on the first side of the print medium, after printing on the first side of the print medium is provided and before printing on the second side of the print medium is provided.

* * * * *